May 15, 1951  A. M. HARP  2,552,966
DAIRY BARN AND POULTRY HOUSE VENTILATOR
Filed July 23, 1948  3 Sheets-Sheet 1

INVENTOR
ALONZO M. HARP
BY Bruno C Lechler
ATTORNEY

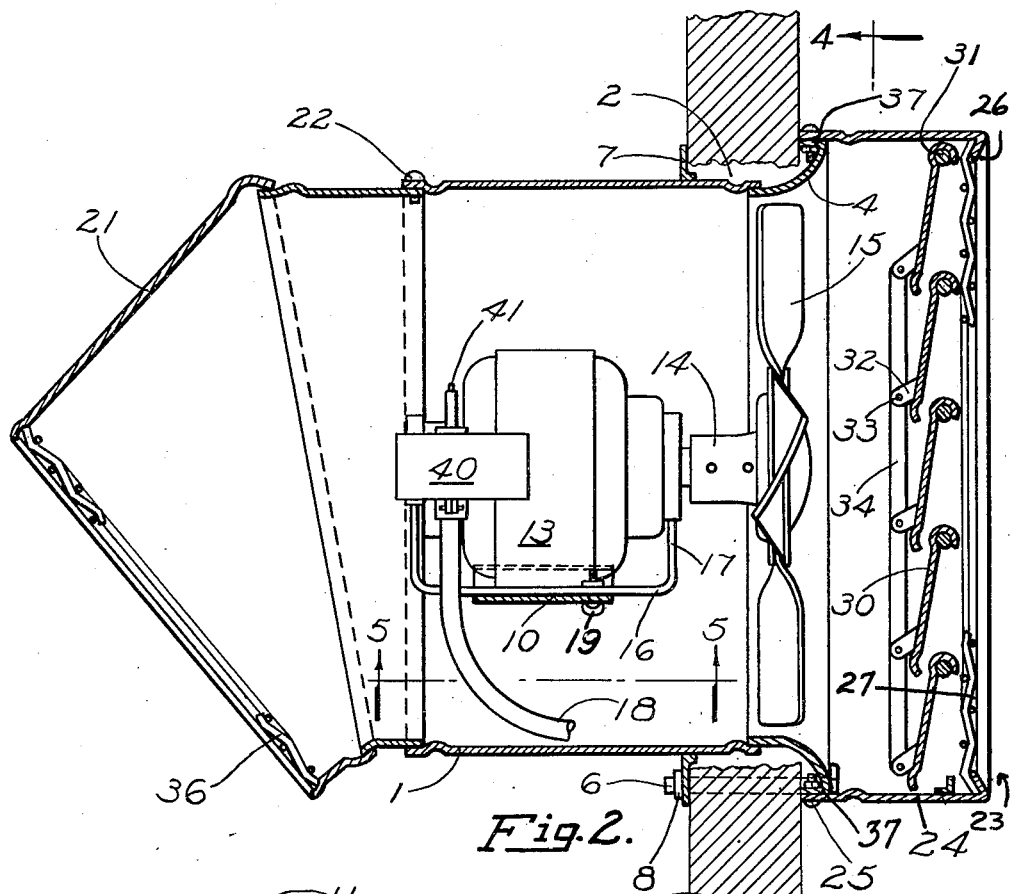
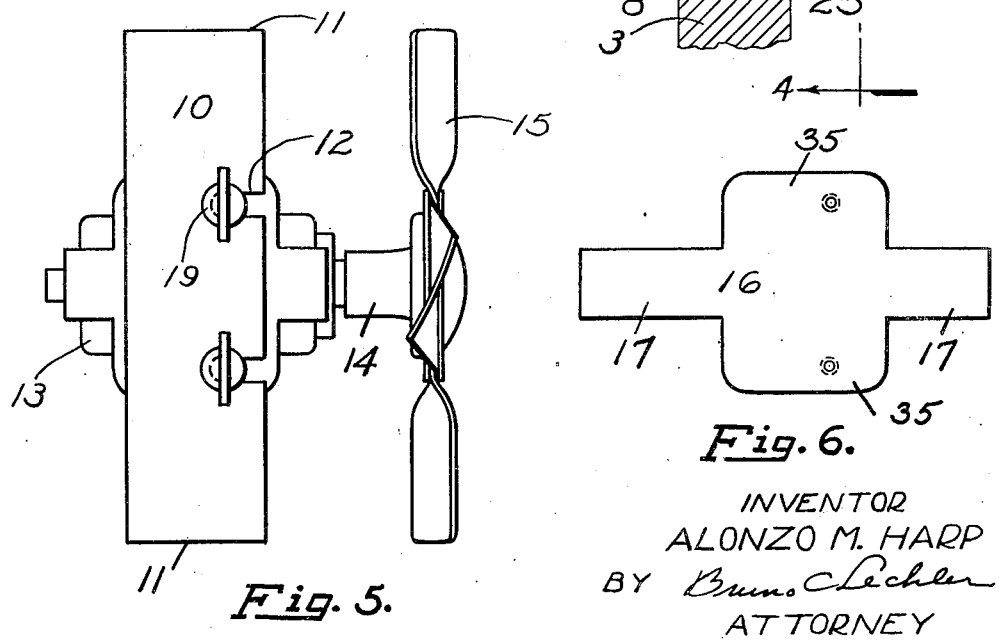

May 15, 1951  A. M. HARP  2,552,966
DAIRY BARN AND POULTRY HOUSE VENTILATOR
Filed July 23, 1948  3 Sheets-Sheet 3

INVENTOR
ALONZO M. HARP
BY Bruno C Lechler
ATTORNEY

Patented May 15, 1951

2,552,966

UNITED STATES PATENT OFFICE 2,552,966

DAIRY BARN AND POULTRY HOUSE VENTILATOR

Alonzo M. Harp, New York, N. Y., assignor to American Machine and Metals, Inc., New York, N. Y., a corporation of Delaware Application July 23, 1948, Serial No. 40,327

5 Claims. (Cl. 98—116)

The invention relates to an improved ventilator particularly adapted for winter use in dairy barns, poultry houses, and similar applications. Summer ventilation is secured by opening barn doors and allowing the animals out of doors much of the time.

Barns and the like are not supplied with artificial heat. The heat radiated by the animals themselves is relied upon to warm the barn in wintertime. To conserve this heat, barns are ordinarily built compact with a low headroom and the doors are left closed in winter.

The primary purpose for ventilating the barn is not to cool the barn, but to remove moisture given off by the animals. This moisture causes rotting of the barn structure, is injurious to the animals, and reduces the milk production in the dairy barn.

The amount of moisture to be removed is large. As a cow drinks approximately 100 pounds of water a day, approximately 1,000 pounds of water will be released by 10 cows in one form or another.

This calls for exhaust fans of relatively large capacity and the operation of such large fans may dissipate the heat radiated by the animal and lower the temperature to an objectionable degree. Temperature controls have been used to reduce the rate at which the air is exhausted as the temperature falls below a critical value. It has been proposed to shut down the exhaust fan entirely if at the reduced rate of operation of the exhaust fan the temperature falls critically. It is objectionable to shut down the fan because when the fan is thus shut down the large amount of moisture in the exhaust air may condense on the fan causing freezing of the fan blades to the fan housing. Where louvers are used, these louvers may also freeze in their closed position. When the fan is frozen in place and the motor is thereafter automatically restarted, the motor may be burned out.

It has now been discovered that a two-speed fan may be so selected that at the high speed the necessary moisture is removed and yet, at the low speed, the volume of air removed will remove less heat than the animals radiate even though the outside temperature is low. In this way the fan need not be stopped entirely and there is no danger of the fan freezing in place.

It is the main object of this invention to provide a ventilating system for a barn or the like capable of lowering the moisture in the barn or the like by means of an exhaust fan which is operated in such a manner as to assure the supply of the required amounts of fresh air to the animals in the barn (approximately 200 lbs. per cow per day) without lowering the barn temperature beyond a pre-set minimum and without the above mentioned risks to the fan, the fan motor and the louvres. To accomplish this general object, the invention provides on one hand for a novel method of fan operation to meet the changes in wintry weather conditions as well as changes in the number of animals occupying the barn and on the other hand for a ventilating device wherein the fan and the louvres are exposed as little as possible to the direct influence of the outside weather. The latter measure diminishes greatly the danger of a break-down of the ventilating device in consequence of severe wintry weather conditions.

More particularly it is the object of the invention to provide a method of ventilating the barn or the like during wintry weather when condensation on the fan or in the passage might freeze locking the fan or the louvres against motion if a single fan is operated at a higher rate than necessary and then shut down while the temperature in the barn is raised by radiation of the animals. This is supplanted by a fan running continuously but alternately at one of two different speeds.

The method contemplates drawing air through the barn at a higher rate than the average rate that would be required for proper ventilation as long as the temperature in the barn is above a preset value and then at a lower rate than is necessary for proper ventilation at least during the time that the temperature in said barn is below the preset value.

In the preferred form of the invention the rate at which air is drawn through the barn is changed from the higher-than-average rate to the lower-than-average rate when the barn temperature reaches the lower limit of a predetermined allowable temperature range in said barn and from the lower-than-average to the higher-than-average rate when the temperature in said barn reaches the upper limit of said allowable temperature range.

The fan is to be selected so that at the higher rate of drawing air through the barn appreciably more air is moved than would be required for providing the animals in the barn with the minimum requirement of fresh air per unit of time, and at the lower rate of drawing air through the barn less air is drawn through than is called for by the minimum requirements of fresh air per unit of time.

It is a further object of the invention to provide a method of ventilating a barn or the like in wintry weather by means of a two-speed exhaust fan wherein the changes from the one speed to the other and back take place in response to changes of the temperature of the exhaust air passing through a duct in which the fan is located.

Still a further object of the invention is to provide a ventilating method as just referred to, wherein the temperature impulses which cause the changes from one rate of exhaustion to the other originate at a point in the path of the air being exhausted by the fan to the outside atmosphere.

A further object of the invention is to provide ventilating apparatus so constructed and arranged with respect to the barn wall as to afford protection to the louvres against freezing in place when the fan is temporarily shut down for cleaning or repair purposes. This object may be achieved by placing the louvres on the inside of the building ahead of the fan. Besides protecting the louvres against freezing, this arrangement also has the advantage that there will be no flapping of the louvres in the wind when the fan is shut down, either temporarily for repair purposes in winter or permanently during summer.

Because of the large amount of moisture and dust particles carried by the air which the fan exhausts from the barn, the motor and the louvres ahead of the motor become covered with large amounts of foreign matter which must be periodically cleaned away. In view thereof it is a further object of the invention to provide such a mounting of the motor and of the louvres that the motor, fan and louvres, arranged in the above mentioned manner, can be rendered accessible for cleaning or repair without difficulty. For this purpose the louvres may be mounted in a box-like structure which is ordinarily secured to the fan housing to form part of the duct for the exhaust air but can be easily removed from this fan housing when desired. This renders the fan and the motor accessible from the inside of the barn. In order to facilitate the withdrawal of the motor and fan from its support after having been made so accessible from the inside of the barn and also to facilitate the replacement of the motor and fan in properly aligned position, the support for the motor is provided with guide slots which extend parallel to the axis of the motor and are open at one end, whereas the motor carries fastening means which extend through these slots when the motor is in place on its support.

Other objects and advantages of the invention will appear as the description proceeds, reference being had to the accompanying drawings in which:

Fig. 2 is a vertical section through one form of a dairy barn ventilating unit;

Fig. 5 is a bottom view, taken along line 5—5 in Fig. 2, of the fan motor and a bracket supporting this motor;

Fig. 6 shows a motor base plate; and

Figure 1:
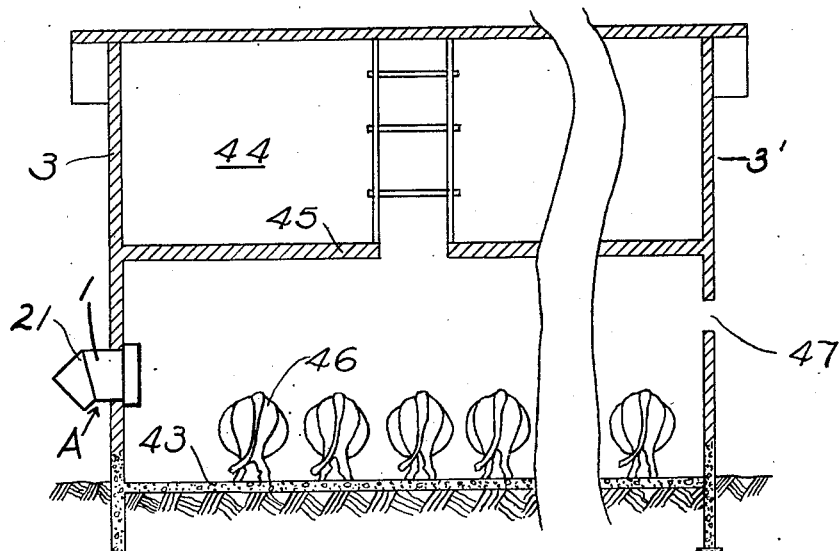
Fig. 1 shows diagrammatically a vertical section through a dairy barn equipped with a ventilating device according to the invention.
Figure 4:
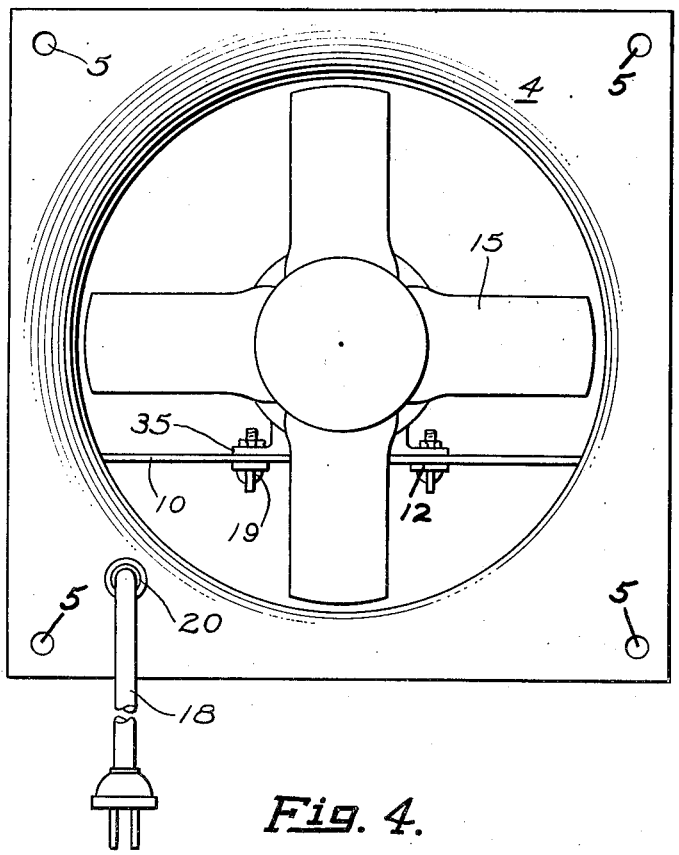
Fig. 4 is an elevation of the fan unit as seen in the direction of the arrows 4—4 in Fig. 2, with the screen and louvres removed.

Referring first to Fig. 1, A indicates generally the housing of a ventilating unit which includes a cylindrical shell 1 extending through a hole 2 in a wall 3 which may be of any desired construction and thickness. The wall 3 forms part of a dairy barn having a floor 43 on which the cows 46 stand, the usual hay loft 44 and an intervening ceiling 45. Air entrance openings 47 are provided in the wall 3' opposite the wall 3 and preferably also in the side walls (not shown). Turning now to the other figures of the drawing, Fig. 2 shows attached to the inward end of the cylindrical shell 1 an entrance ring 4 of curved profile. While the edge of this ring which adjoins the shell 1 is circular, its other edge, which extends inside of the barn and is turned backwardly to form a flange 37 bearing against the inner face of the wall 3, is of square shape, as best seen in Fig. 4. Holes 5 are provided near the corners of the square edge of the ring 4 and bolts 6 may be passed through these holes and through corresponding openings in the wall. A square supporting plate 7 has a central circular opening of the same diameter as the outside of shell 1. This plate is provided with holes similar and corresponding to the holes 5 in the ring 4 for the passage of the bolts 6. By drawing up nuts 8 on these bolts 6, the slideable plate 7 and the entrance ring 4 can be drawn towards each other with the wall 3 situated between them and thereby the entire ventilating unit may be readily mounted in the barn wall 3. A plate 10 extending horizontally across the shell 1 is fastened to the latter in such a manner as to provide a good heat-conducting junction between the plate 10 and the shell 1. For example, the plate 10 may be welded to the shell 1 along its edges 11, or the end of the plate 10 may be turned upwardly as indicated in Fig. 2 and riveted to the side of the shell. The plate 10 has slots 12 which extend towards the barn and are open at one end. Supported on the plate 10 by means of a base 16 is a motor 13 whose shaft carries the hub 14 of a fan 15 revolving within the entrance ring 4. The base 16 consists in the example shown of a plate cruciform in shape. The two longer arms 17 of the plate 16 are bent upwardly and attached to the ends of the motor housing, whereas the two shorter arms 35 are attached to the plate 10. Thus, there is provided for an effective heat transfer from the motor housing to the plate 10 and through that plate to the shell 1 whose outside is exposed to the cold outside air. The base plate 16 has tap holes through which thumb screws 19 extend. These thumb screws, when tightened, hold the motor 13 rigidly against the plate 10 and also hold the motor in proper alignment so that the blades 15 of the fan will not strike the sides of the entrance ring 4.

Figure 3:
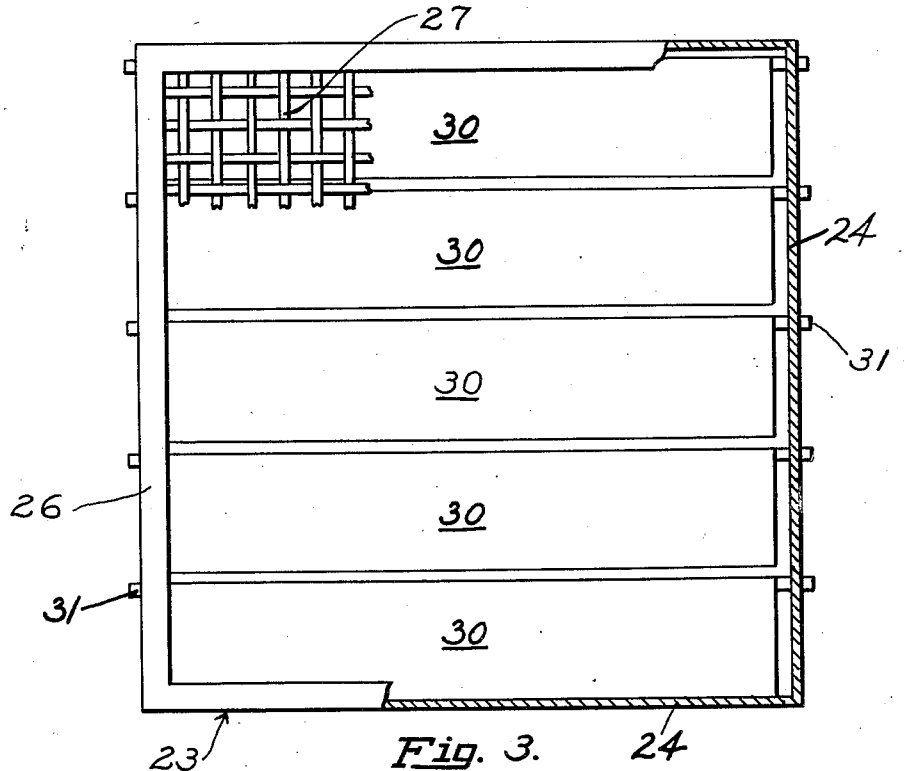
Fig. 3 shows in a front view, with portions broken away, the box-like structure with louvres and protecting screen illustrated in a longitudinal section at the right end of Fig. 2.

The rear or outside end of the fan housing is formed by a sheet metal pipe angle 21 adapted to be attached to the cylindrical shell 1 by means of one or more screws 22 after the shell 1 containing the fan has been slipped into its place in the hole 2 of the wall 3. The downwardly facing outlet of the angle 21 is protected by a screen 36. After the fan assembly has been mounted in the wall 3 by means of the bolts 6, an air entry box 23, shown in Figs. 2 and 3, is attached to the housing 1, 4. This box consists of a generally rectangular frame made of a sheet metal angle. One leg 24 of this angle extends backwardly and alongside of the flange 37 of the entrance ring 4 and may be attached to said flange by screws 25, whereas the other leg 26 of the angle 23 is turned inwardly and supports an entry screen 27. Directly behind this screen 27 are a number of louvres 30. Each louvre may consist of a plate bent at its upper end around a rod 31. The rods 31 pass through holes in the vertical walls of the air entry box 23. Each louvre is provided with an extension 32 which carries a bolt 33 in its end. All the bolts 33 are connected by a vertical bar 34 so that all of the louvres move in unison.

Figure 7:
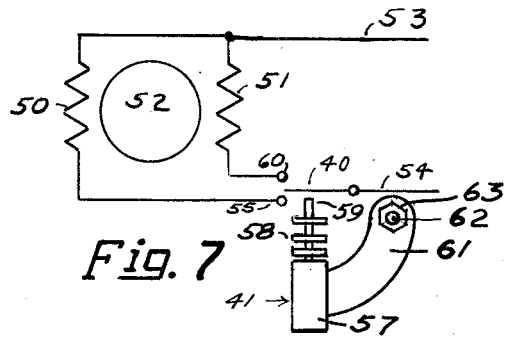
Fig. 7 shows a diagram of the motor circuit.

Current is supplied to the motor 13 by a cable 18 which passes through an opening 20 in the entrance ring 4. The edges of the opening 20 are preferably protected by a rubber grommet. The motor 13 is of the type having two field windings 50 and 51 alternately operable upon a common armature 52 as shown in Fig. 7. When the winding 50 is energized it will drive the armature 52 at one rate of speed, say the low speed, whereas, when the other winding 51 is energized, it will drive the armature at a different speed, say the high speed. Current is supplied through lines 53 and 54 contained in a cable 18 and a microswitch 40 which permits energizing one of the field windings 50, 51, or the other.

41 indicates generally a thermostatic unit adapted to actuate the switch 40. This thermostatic unit is arranged at a point of the exhaust air duct 23, 4, 1, 21 between the fan 15 and the outside atmosphere, and it may comprise a closed chamber 57 carried by an arm 61 which is pivotally mounted on a stud 62 on which it may be clamped by means of a lock nut 63. Communicating with the closed chamber 57 are bellows 58 so that, when a liquid contained in the chamber 57 will expand due to a rise in temperature of the ambient air drawn past the thermostat by the fan 15 driven by the armature 52, also the bellows 58 will expand. Secured to the upper end of the bellows 58 is a button 59 adapted to engage the lower side of the microswitch 40 when the ambient air is above a certain minimum temperature. The switch 40 is biased so that it will make contact with the terminal 55 of the low speed winding 50 if not prevented from doing so by button 59, whereas it will contact the terminal 60 of the highspeed winding 51 when the temperature of the ambient air is above a given value. The temperature value at which the contact of the switch 40 will switch from terminal 55 to terminal 60 can be selected by adjusting the position of the button 59 relative to the microswitch 40 by turning the arm 61 on the stud 62 and locking it in the desired position by means of the nut 63. Thus the distance the button 59 has to move from the position which it assumes at a given air temperature, say at the temperature of 50° C., to the position in which it encounters the switch 40 in contact with terminal 55, can be varied. The position of the thermostat 41 is to be adjusted so that the button 59 will hold the switch 40 in contact with the high speed terminal 60 until the temperature of the ambient air flowing past the thermostat falls below the minimum allowable temperature in the barn. When this happens, the bellows 58 will contract so as to allow the microswitch 40 to follow its bias, thereby breaking the circuit through the high speed coil 51 and establishing the circuit through the low speed coil 50. This reduces the rate at which the air is removed from the barn. Since the radiation of heat from the animals continues substantially at the same rate as before, the temperature of the exhaust air will now rise. The bellows 58 will expand correspondingly and upon the button 59 reaching the position in which the bias of the switch 40 is overcome, said switch is again thrown so as to move the current from the low-speed winding of the motor to the high-speed winding. This increases the rate at which air is drawn from the barn and this will cause the thermostat to again reverse its direction of movement as the larger volume of air withdrawn causes the barn temperature to drop. In this manner the fan will exhaust air from the barn all the time but will reduce its rate of exhaustion as soon as continuing exhaustion at the higher rate would lead to a lower temperature in the barn than would be comfortable for the animals.

Due to the fact that the fan 15 is located at a point of the air duct which is within the barn wall, whereas a relatively large length of the shell 1 extends outside of said barn wall, with the motor situated between the fan and the opening of the exhaust air duct to the outside air, the fan is protected to a high degree against freezing in position due to condensation of the moisture contained in the air passing the air duct. At least equally well protected against freezing are the louvres which are placed completely within the air space of the barn or the like and inside of the fan. Being so positioned, they not only will not freeze shut but also they will not flap in windy weather even when the fan is at a standstill, either temporarily or for a long time, such as during the summer.

If it is desired to clean the louvres and/or the motor and the fan, the box-like extension 23 is removed from the entrance ring 4 by unscrewing the screws 25. The louvres can now be readily cleaned. By reaching between the fan blades and loosening the thumb screws 19, the motor 13 together with the fan 14, 15 can be removed into the barn for inspection, oiling and removing the accumulation of barn refuse which has been drawn into the air duct with the air sucked by the fan. If the cable 18 is of sufficient length, the motor 13 with the fan 14, 15 can be taken into the barn without disconnecting the cable 18.

In replacing the motor and fan, the motor is placed on the supporting plate 10 in such a manner that the shafts of the thumb screws 19 enter the open ends of the slots 12 in the plate 10 whereupon the motor is slid back until said shafts of the screws 19 encounter the ends of the slots 12. Then the screws 19 are tightened which automatically assures a proper alignment of the fan blades 15 with regard to the entrance ring 4. Upon replacement of the box 23 on the entrance ring 4 by means of the screws 25, the device is again ready for operation.

While I have shown in the drawings one particular embodiment of the invention, I desire it to be understood that this embodiment has been given by way of example and illustration only, since the method of the invention may be carried out by two-speed fan arrangements which may differ in construction from the device shown and, furthermore, various modifications and changes may be made in the construction of the ventilating device shown without departing from the spirit of the invention or the scope of the appended claims.

What I claim is:

1. A ventilating device for a barn or the like, comprising a housing adapted to be mounted in an opening of a wall of said barn or the like, said housing including a cylindrical shell which, when the housing is mounted in said wall, extends outside from said wall, an entrance ring secured to said shell at the inner end thereof so as to extend, when in place, beyond the inner side of said wall and having an edge adapted to bear against the inner face of said wall, a box-like extension secured to the inner side of said entrance ring, a support within that portion of said shell which extends outside of said wall, a two-speed motor in said housing mounted on said support and having a shaft extending towards said entrance ring and said box-like extension, an exhaust fan attached to said motor shaft so as to operate within said entrance ring, louvers pivotally mounted in said box-like extension so as to be located within the barn and to be held in open position when the fan is operating, switching means for setting said motor for operation at one or the other of its two speeds, temperature responsive means for controlling said switching means, said temperature responsive means being adapted to actuate said switching means at either end of a pre-set temperature range causing said motor to change from its higher speed to its lower speed when the temperature effective upon said temperature responsive means reaches the lower limit of said temperature range and from its lower speed to its higher speed when said temperature reaches the upper limit of said temperature range, said temperature responsive means being situated at a point between said fan and the outside atmosphere, said motor support having on the side directed towards the interior of the barn a plurality of open slots extending parallel to the axis of the motor and fan and said motor having a plurality of fastening means adapted to extend through said slots when the motor is in place.

2. A ventilating device for a barn or the like, comprising a housing adapted to be mounted in an opening of a wall of said barn or the like, said housing including a cylindrical shell which, when the housing is mounted in said wall, extends outside from said wall, an entrance ring secured to said shell at the inner end thereof so as to extend, when in place, beyond the inner side of said wall and having an edge adapted to bear against the inner face of said wall, a box-like extension secured to the inner side of said entrance ring, a support within that portion of said shell which extends outside of said wall, a two-speed motor in said housing mounted on said support and having a shaft extending towards said entrance ring and said box-like extension, an exhaust fan attached to said motor shaft so as to operate within said entrance ring, louvers pivotally mounted in said box-like extension so as to be located within the barn and to be held in open position when the fan is operating, switching means for setting said motor for operation at one or the other of its two speeds, temperature responsive means for controlling said switching means, said temperature responsive means being adapted to actuate said switching means at either end of a pre-set temperature range causing said motor to change from its higher speed to its lower speed when the temperature effective upon said temperature responsive means reaches the lower limit of said temperature range and from its lower speed to its higher speed when said temperature reaches the upper limit of said temperature range, said temperature responsive means being situated at a point between said fan and the outside atmosphere, said motor support having on the side directed towards the interior of the barn a plurality of open slots extending parallel to the axis of the motor and fan and said motor having a plurality of fastening means adapted to extend through said slots when the motor is in place, a plate having a circular opening slideable on said cylindrical shell, and means for drawing said slideable plate and said entrance ring towards each other with said wall situated between said supporting means and said edge of said entrance ring.

3. A ventilating device particularly adapted for permanent installation in an irregular shaped opening in the wall of a building to draw out dust laden air which has an air moving unit readily detachable to remove dust deposited thereon by the air comprising, a hollow cylinder longer than the thickness of the building wall and adapted to extend horizontally through an irregular opening therein, a rectangular flat plate whose edges are turned at right angles to form a flange adapted to bear against the inner face of the wall beyond the limits of the irregular opening in the wall and to space the plate away from the wall, a central circular opening in said flat plate whose edge is curved outwardly from the space to be ventilated to form an annular flared flange and to meet the open end of said cylinder, a horizontal shelf extending across said cylinder and attached thereto, a plurality of parallel open-ended slots cut into said shelf extending in a direction parallel to the axis of said cylinder with the open end of said slots directed towards the interior of the building, an air moving unit removably mounted in said cylinder comprising a motor supported on said shelf and a fan supported on the shaft of said motor coaxial with the central circular opening in said flat plate, studs carried by the motor and extending through the slots in said shelf which will realign said motor within the duct when said motor is replaced on the shelf after cleaning with the studs bearing against the ends of said slots, means on said studs for clamping said motor to the shelf, a box-shaped housing whose sides are removably secured to the flanges at the outer edges of said flat plate, an opening in the front of said housing, louver plates having horizontal axes passing through the sides of said housing so that when the motor turns the fan air is drawn past the louvers and through the cylinder and ejected from the building.

4. A ventilating device particularly adapted for permanent installation in an irregular shaped opening in the wall of a building to draw out dust laden air which has an air moving unit readily detachable to remove dust deposited thereon by the air comprising, a hollow cylinder longer than the thickness of the building wall and adapted to extend horizontally through an irregular opening therein, a rectangular flat plate whose edges are turned at right angles to form a flange adapted to bear against the inner face of the wall beyond the limits of the irregular opening in the wall and to space the plate away from the wall, a central circular opening in said flat plate whose edge is curved outwardly from the space to be ventilated to form an annular flared flange and to meet the open end of said cylinder, a horizontal shelf extending across said cylinder and attached thereto, a plurality of parallel open-ended slots cut into said shelf extending in a direction parallel to the axis of said cylinder with the open end of said slots directed towards the interior of the building, an air moving unit removably mounted in said cylinder comprising a motor supported on said shelf and a fan supported on the shaft of said flat plate, studs carried by the motor and extending through the slots in said shelf which will realign said motor within the duct when said motor is replaced on the shelf after cleaning with the studs bearing against the ends of said slots, means on said studs for clamping said motor to the shelf, a box-shaped housing whose sides are removably secured to the flanges at the outer edges of said flat plate, an opening in the front of said housing, louver plates having horizontal axes passing through the sides of said housing so that when the motor turns the fan air is drawn past the louvers and through the cylinder and ejected from the building, and a plate located outside of the wall having a circular opening loosely fitting around said cylinder and means for drawing said plate and said rectangular flat plate toward each other against opposite faces of the wall to rigidly support said hollow cylinder and said rectangular flat plate in said wall and to seal off the portion of the opening in the wall not filled by the cylinder.

5. A ventilating device particularly adapted for permanent installation in an irregular shaped opening in the wall of a building to draw out dust laden air which has an air moving unit readily detachable to remove dust deposited thereon by the air comprising, a hollow cylinder longer than the thickness of the building wall and adapted to extend horizontally through an irregular opening therein, a rectangular flat plate whose edges are turned at right angles to form a flange adapted to bear against the inner face of the wall beyond the limits of the irregular opening in the wall and to space the plate away from the wall, a central opening in said flat plate whose edge is curved outwardly from the space to be ventilated to form an annular flared flange and to meet the open end of said cylinder, a horizontal shelf extending across said cylinder and attached thereto, a plurality of parallel open-ended slots cut into said shelf extending in a direction parallel to the axis of said cylinder, with the open end of said slots towards the interior of the building, an air moving unit removably mounted in said cylinder comprising a two speed motor supported on said shelf and a fan supported on the shaft of said motor coaxial with the central circular opening in said flat plate, studs carried by the motor and extending through the slots in said shelf which will realign said motor within the duct when said motor is replaced on the shelf after cleaning with the studs bearing against the ends of said slots, means on said studs for clamping said motor to the shelf, a box-shaped housing whose sides are removably secured to the flanges at the outer edges of said flat plate, an opening in the front of said housing, louver plates having horizontal axes passing through the sides of said housing so that when the motor turns the fan air is drawn past the louvers and through the cylinder and ejected from the building, and switching means for setting said motor for operation at one or the other of its two speeds, temperature responsive means for controlling said switching means, said temperature responsive means being adapted to actuate said switching means at either end of a pre-set temperature range causing said motor to change from its higher speed to its lower speed when the temperature effective upon said temperature responsive means reaches the lower limit of said temperature range and from its lower speed to its higher speed when said temperature reaches the upper limit of said temperature range, said temperature responsive means being situated at a point between said fan and the outside atmosphere.

ALONZO M. HARP.

REFERENCES CITED

The following references are of record in the file of this patent:

UNITED STATES PATENTS

| Number | Name | Date |
|---|---|---|
| 1,739,082 | Simmons et al. | Dec. 10, 1929 |
| 1,778,560 | Marsh et al. | Oct. 14, 1930 |
| 1,924,489 | Ferris | Aug. 29, 1933 |
| 1,935,216 | Sievert | Nov. 14, 1933 |
| 2,005,615 | Ferris | June 18, 1935 |
| 2,030,993 | Langenkamp et al. | Feb. 18, 1936 |
| 2,084,807 | Hueglin | June 22, 1937 |
| 2,252,179 | Hueglin | Aug. 12, 1941 |
| 2,256,350 | Nystrom | Sept. 16, 1941 |
| 2,295,451 | Davis Jr. et al. | Sept. 8, 1942 |